INVENTORS:
GABRIEL XAVIER ROGER BOUSSU
GEORGES LOUIS TRAVERS
BY
THEIR ATTORNEYS

July 20, 1965 G. X. R. BOUSSU ETAL 3,195,604
OUTER TIRE COVER WITH RADIAL CARCASS AND RIGID CROWN
Filed Oct. 2, 1962 2 Sheets-Sheet 2

INVENTORS:
GABRIEL XAVIER ROGER BOUSSU
GEORGES LOUIS TRAVERS
BY
THEIR ATTORNEYS

United States Patent Office 3,195,604
Patented July 20, 1965

3,195,604
OUTER TIRE COVER WITH RADIAL CARCASS AND RIGID CROWN
Gabriel Xavier Roger Boussu, Chamalieres, and Georges Louis Travers, Clermont-Ferrand, France, assignors to Michelin & Cie, Clermont-Ferrand, Puy-de-Dome, France
Filed Oct. 2, 1962, Ser. No. 227,847
Claims priority, application France, Oct. 4, 1961, 1,739
5 Claims. (Cl. 152—361)

This invention relates to improvements in pneumatic tire casings of the tubeless and tube-containing types.

In accordance with the invention, tire casings are provided which include a carcass comprising a ply of radially directed cords extending from the beads of the casing at least to the edges of the tread, a tread reinforced by means of at least two plies of cords which cross each other and are inclined to the median plane of the casing and two spaced apart, narrow tread reinforcing strips located at the opposite lateral edge portions of the crossed reinforcing plies adjacent to the carcass ply.

Preferably, in order not to unduly stiffen the lateral edges of the tread, these narrow marginal strips should be located radially as near to the carcass ply as possible, either inwardly or outwardly thereof.

The term "cord" as used herein, includes metallic wires, metallic cables and natural and synthetic textile filaments, threads and cords.

More particularly, in accordance with the invention, the narrow reinforcing strips may be composed of parallel cords extending substantially radially of the tire casing, strips of an elastomer having a modulus of elasticity of at least 800 g./mm.$^2$ at 100% elongation or a combination of the two.

Tire casings of the type embodying the invention have been found to have numerous advantages over prior tires from the standpoints of roadability, riding comfort and resistance to damage and especially the damage which occurs from driving over hard, rocky ground.

It has been recognized in the past that tire casings provided with carcass plies extending exclusively radially have improved riding comfort as compared with tire casings having carcass plies laid on a bias. However, the radial disposition of the carcass ply or plies renders the tire casing less stable with regard to roadability than casings having bias laid plies. The instability of the tire casings having a radial ply or plies has been overcome in the past by adding reinforcing plies or crown plies to the tread zone of the tire.

The new tire embodying the present invention has both of the advantages indicated above and in addition, by virtue of the novel arrangement of the narrow reinforcing plies, eliminates a defect known as "hatchet effect" in which the tire splits at the inside due to stress concentration between the radially extending cords when striking sharp rocks or the like. On the other hand, the provision and location of the transversely spaced narrow reinforcing plies maintain tread stability without rendering the tread excessively rigid and without adding weight around the center or median plane of the tire. The presence of the narrow reinforcing plies at the edges of the crown plies aids in distributing stresses thereon and precludes separation of the ends of the crown ply cords from the tread material due to flexing and radial expansion and contraction of the plies during the operation of the tire.

For a better understanding of the present invention, reference may be had to the accompanying drawing in which.

Figure 1:
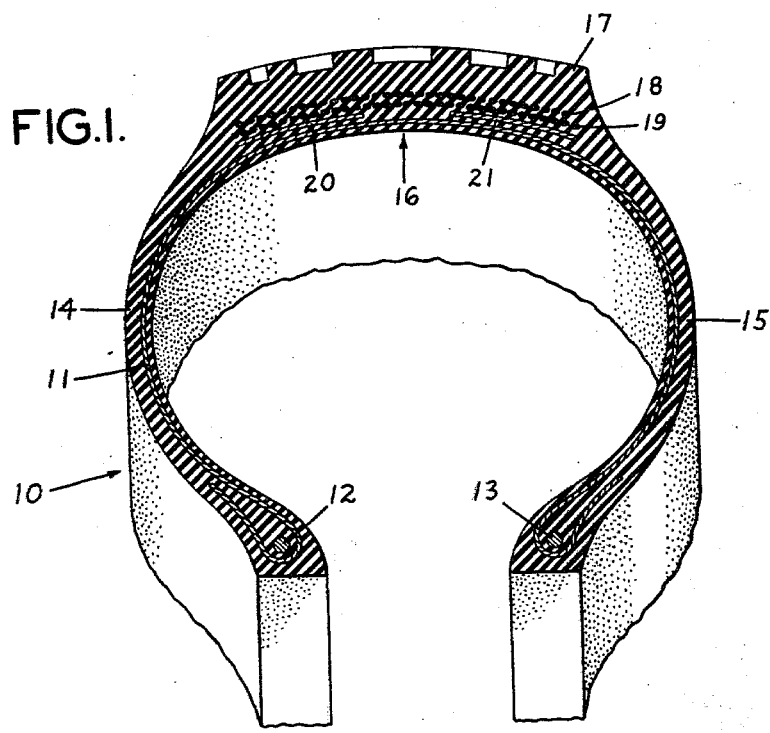
FIGURE 1 is a view in cross-section through a portion of a tire embodying the present invention.
Figure 2:
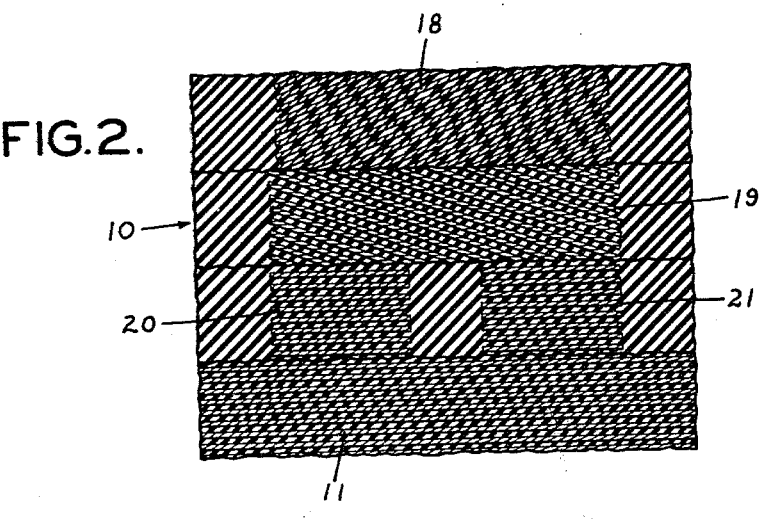
FIGURE 2 is a plan view of a portion of the tire casing shown in FIGURE 1 with portions broken away to disclose the arrangement of the ply cords therein.

As shown in FIGURES 1 and 2 of the drawings, a typical tire casing 10 in accordance with the invention includes a carcass 11 which comprises a ply of parallel cords which are wrapped around the bead wires 12 and 13 of the tire casing, extend through the side walls 14 and 15 of the casing and are embedded and adhered to the rubber therein and across the tread zone 16 of the casing. A running tread band 17 is mounted on the casing in the usual way and is provided with two or more tread reinforcing or crown plies 18 and 19, each composed of a plurality of parallel cords, the cords of the ply 18 crossing and inclined to the cords of the ply 19, and both being inclined with respect to the median plane of the tire and the carcass ply 11.

In addition to the plies described above and in accordance with the present invention, the casing is provided with two narrow plies 20 and 21, each composed of parallel cords which are disposed substantially parallel with the cords of the carcass ply 11 and, in any case, not in excess of an inclination of 60° to the median plane of the tire and are interposed between the outer edges of the plies 18 and 19 and the carcass ply and terminating at their outer edges at about the edges of the tread 17.

A center zone having a width of about 18% and 36% of the width of the tread is left between the inner opposing edges of the plies 20 and 21. In other words, each of the marginal plies 20 and 21 should have a width between about 32% and 41% of the width of the tread. For the best roadability of the tire and for avoiding undue restriction of radial flexure of the casing thereby preventing loss of cohesion between the ends of the cords in the plies 18 and 19 and the tread, the marginal plies 20 and 21 should not extend appreciably beyond the widest of the plies 18 and 19, in this embodiment, the ply 19.

Figure 3:
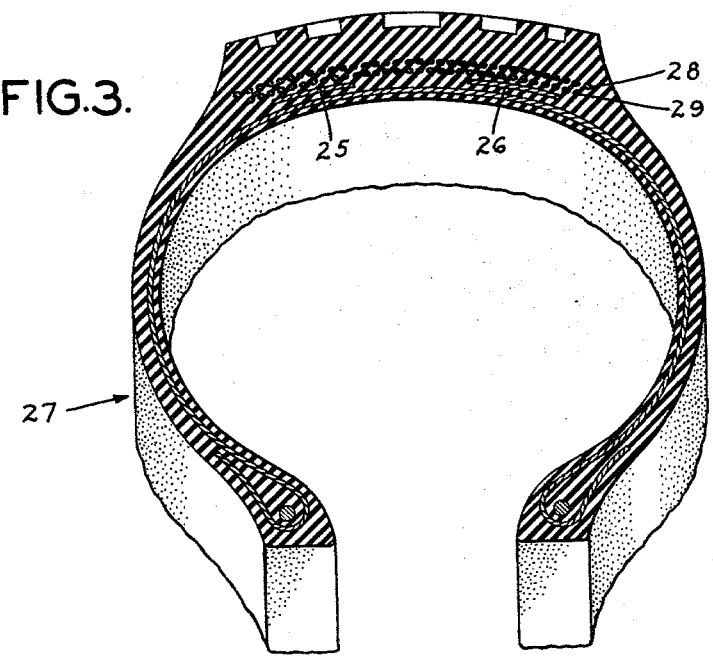
FIGURE 3 is a view in cross-section through a modified form of tire embodying the invention.

As shown in FIGURE 3, the marginal plies 25 and 26 of the tire casing 27 are disposed inwardly of the lateral edges of the crown plies 28 and 29 which are constructed and arranged as described above.

Figure 4:
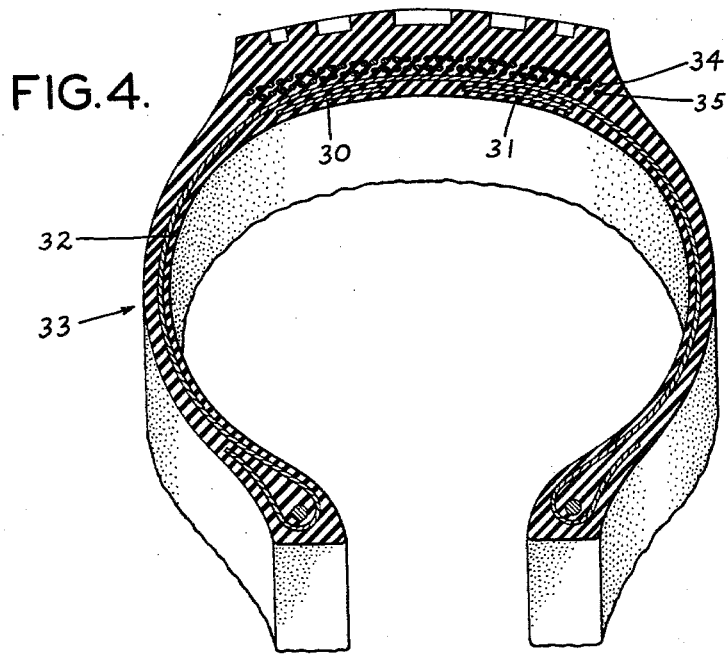
FIGURE 4 is a view in cross-section through a portion of still another form of tire embodying the invention.

In another modification shown in FIGURE 4, the marginal plies 30 and 31 are disposed inwardly of the carcass ply 32 of the tire casing 33 and also inwardly of the lateral edges of the crown plies 34 and 35.

In still another modification not shown, the narrow marginal plies are disposed radially outwardly of the innermost crown ply.

In each of the forms of the invention shown in FIGURES 1 to 4, the cords of the carcass ply are arranged radially and the cords in each crown ply are parallel and disposed at an angle between about 15° and 30° to the median plane of tire casing. While, as illustrated in the drawings, the marginal plies 20 and 21, 25 and 26 and 30 and 31 in each of FIGURES 1 to 4 are disclosed and described as being composed of cords, bands of natural or synthetic elastomers having a modulus of elasticity at least as great as 800 g./mm.$^2$ at 100% elongation may be used instead. Moreover, cords embedded in the aforementioned elastomer may also be used.

A great advantage of the structure described above is that the marginal plies aid the outer crown plies in maintaining tread stability but their absence in the mid-portion of the tire tread prevents transmission and concentration of stress due to sharp deflection of the tire tread and thereby precludes splitting ("hatchet effect") from occurring within the tire casing and between the carcass ply cords. This result is accomplished without rendering the tire casing unnecessarily rigid in the tread zone, with the resulting loss of riding comfort and, in fact, it enables the production of tires of less weight and excellent roadability and riding comfort. The spaced apart relation of the marginal plies in the tread zone of the tires permits freer radial flexing and expansion and contraction of the tire casing when running over rough surfaces and distributes the stresses in the tread zone in such a manner as to materially reduce the loosening of the ends of the cords in the crossed crown plies from the tread.

The present invention is particularly useful in tires in which the carcass and crown plies are formed of metallic wires or metallic cables, but it is also of advantage in tires in which the plies are formed of non-metallic cords, threads, filaments and the like. Accordingly, it will be understood that the invention is susceptible to considerable latitude in its application and is limited only as defined in the following claims.

I claim:

1. A tire casing comprising a tread, sidewalls on opposite sides of said tread and beads at an edge of each sidewall, a single carcass ply of radially directed cords extending from each bead through said sidewall at least to the adjacent edge of said tread, at least two crown plies of cords in said tread, the cords in each crown ply being substantially parallel and the cords in one of said crown plies crossing the cords of the other crown ply and the cords of both of said crown plies being inclined to the median plane of said tire casing, and a single pair only of marginal reinforcing plies in said tread and adjacent said carcass ply, said marginal plies consisting of metallic members sheathed in an elastomer and disposed substantially parallel to the cords of said carcass ply, said marginal plies being spaced-apart transversely of said tread and having outer edges disposed not substantially outwardly of the outer edges of said crown plies and being mainly resistant to stresses in a direction substantially parallel to the cords of said carcass ply.

2. The tire set forth in claim 1 in which each of the marginal plies has a width of about 32% to 41% of the width of said tread.

3. The tire casing set forth in claim 1 in which each of the marginal plies is between the radial carcass ply and the innermost crown ply.

4. The tire casing set forth in claim 1 in which said marginal plies are disposed radially inwardly of said carcass ply.

5. A tire casing as set forth in claim 1 wherein the elastomer sheathing for the metallic members has a modulus of elasticity of at least 800 g./mm.$^2$ at 100% elongation.

References Cited by the Examiner

UNITED STATES PATENTS 2,958,359  11/60  Boussu et al. _____ 152—354

FOREIGN PATENTS 1,203,076  7/59  France.
1,253,395  1/61  France.
1,258,886  3/61  France.

ARTHUR L. LA POINT, *Primary Examiner.*